(12) United States Patent
Lin et al.

(10) Patent No.: US 7,094,815 B2
(45) Date of Patent: Aug. 22, 2006

(54) CLAY/AMO COMPLEX AND DERIVATIVE THEREOF AND METHOD FOR PRODUCING THE SAME

(75) Inventors: Jiang-Jen Lin, Taichung (TW); Chung-Ming Tsai, Ping-Tung County (TW)

(73) Assignee: National Chung-Hsing University, Taichun (TW)

( * ) Notice: Subject to any disclaimer, the term of this patent is extended or adjusted under 35 U.S.C. 154(b) by 432 days.

(21) Appl. No.: 10/270,227

(22) Filed: Oct. 15, 2002

(65) Prior Publication Data
US 2004/0069188 A1  Apr. 15, 2004

(51) Int. Cl.
*C08K 9/04* (2006.01)
*C08K 3/34* (2006.01)

(52) U.S. Cl. ............... 523/216; 524/445; 524/446; 524/449; 528/107; 428/402

(58) Field of Classification Search ............ 523/216; 528/107; 524/445, 446, 449; 428/402
See application file for complete search history.

(56) References Cited

U.S. PATENT DOCUMENTS

| 5,101,060 A | * | 3/1992 | Speranza et al. ........... 558/390 |
| 6,107,387 A | * | 8/2000 | Kaylo et al. ................. 524/446 |
| 6,765,050 B1 | * | 7/2004 | Lin et al. .................... 524/445 |

* cited by examiner

*Primary Examiner*—Tae H. Yoon
(74) *Attorney, Agent, or Firm*—Charles E. Baxley

(57) ABSTRACT

The present invention discloses a clay/amine complex which is an excellent surfactant and a good reinforcing agent of polymers. The complex of the present invention can be produced by modifying layered inorganic silicate clay such as montomorillonite, with an intercalating agent, AMO (amine terminal-mannich oligomer). The AMO can be obtained by polymerizing polyoxyalkylene amine having molecular weight over 1000, p-cresol and formaldehyde. The present invention further discloses a nanosilica plate, which can be obtained by extracting the above complex with a hydroxide or a chloride of alkali metal or alkaline-earth metal, and consequently, the AMO intercalating agent can be recycled for reusing.

5 Claims, 1 Drawing Sheet

CLAY/AMO COMPLEX AND DERIVATIVE THEREOF AND METHOD FOR PRODUCING THE SAME

BACKGROUND OF THE INVENTION

1. Field of the Invention

The present invention relates to a silicate clay/AMO complex and a derivative thereof and, more particularly, to a silicate clay/AMO complex and a derivative thereof wherein the AMO (Amine terminating-Mannich Oligomer, prepared from Mannich reaction of p-cresol) serves as an intercalating agent. The present invention also relates to a method for producing the clay/AMO complex and the derivative thereof. Alternatively, the layered silicates are delaminated into individual silicate plate and AMO is extracted out and recycled.

2. Related Prior Art

Currently, inorganic/organic polymer complex materials under a nanoscale regime are one of the most significant materials, and thus have been widely investigated and developed. Such complex materials are dual-phased wherein at least one phase is dispersed under a nanoscale regime. Accordingly, compatibility between the two phases, for example, clay and polymers, is always essential for the nanoscale dispersion.

For layered silicate clay which is hydrophilic and immiscible with most organic solvents, the interlayer distances can be enlarged by means of intercalating with organic quaternary ammonium, and thus monomers are allowed to enter therethrough. The monomers can be polymerized within the interlayer space to obtain an exfoliated inorganic/organic polymer complex material. In principle, the distances, enlarged by intercalating agents, are constant and required to be wide enough for monomer or polymer molecules to enter. As for exfoliation, the interlayer distances are irregular and different directions may occur in each layer.

Conventional intercalating agents such as 12-aminolauric acid, hexadecylamine, fatty amine, bis(2-hydroxyethyl) methyl tallow alkyl amine and stearylamine, usually have low molecular weights and can be converted into the corresponding ammonium salts such as quaternary chloride salt, and interlayer distances of the clay can be ionically exchanged and hence sterically expanded to a certain degree of interlayer spacing.

Referring to the research of T. J. Pinnavaia (Michigan State University), intercalating agent $CH_3(CH_2)_n—NH_3^+$ is provided to exchanged with metal ion salts within the layer-structural montmorillonite (MMT) in resulting intercalated MMT, which is then dispersed in diglycidyl ether of BPA (such as epoxy resin Shell Epon828) to form a epoxy polymer-clay complex material under a well-dispersed nanoscale regime. For such intercalating agent, the interlayer distances can be enlarged to 18.0 Å. The epoxy resin can then form an epoxy/clay material through curing polymerization at 75° C. This reference also indicates an improvement in heat distortion temperature. The intercalating agent performs a rule of monolayer to bilayer, and even to pseudo-trimolayer. The interlayer distance ranges between 13.8–18.0 Å, which allow the epoxy resin to enter and polymerize therein, and further to exfoliate the layered inorganic matter so that application advantages of nonomaterials can be achieved.

Japanese Patent No. 8-22946 discloses the first commercial inorganic/organic polymer complex material under a nanoscale regime, which is developed by Toyota Company. This complex material is produced by dispersing $[H_3N^+(CH_2)_{11}COO^-]$-montmorillonite in Nylon 6, wherein the aminocarboxylic acid is provided as an intercalating agent and the polymers are formed between layers of the aminoacid intercalated clay through condensation of caprolactam monomers to Nylon 6 polymer. However, the aminocarboxylic acid intercalating agent is hydrophilic and doesn't facilitate nonpolar polymers such as polyethylene and polypropylene, to uniformly disperse in the hydrophilic layered silicate. Accordingly, Japanese Patent Publication No. 8-53572 provides other organic onium ions as an intercalating agent to mix with layered silicate, which can be uniformly dispersed in molten polyolefin resin. Unfortunately, though the organic onium ions can enlarge the interlayer distances to certain degree, affinity between the intercalating agent and the polyolefin resin is not enough to exfoliate the layered silicate. Further, Japanese Patent Publication No. 10-182892 indicates that when blending in a molten mixture containing olefin oligomers with H-bond and polyolefin resin, the organized layered silicate might be indefinitely swelled due to the strong affinity therebetween. However, it's a dilemma whether to increase the oligomers for better dispersing or to decrease the oligomers for better mechanical characteristics.

Accordingly, there is a need to ameliorate the complexes by means of providing appropriate intercalating agents which could render the intercalated silicates with a wider interlayer distance and tailored spacing for more compatible with polymer materials. Furthermore, the widely opened silicates can be further tailored and used as novel inorganic/organic surfactants, an important industrial application but deviated from the common nanocomposite usages.

SUMMARY OF THE INVENTION

An object of the present invention is to provide a layered silicate clay/AMO complex and a method for producing the same, whereby the clay/AMO complex can exhibit excellent interfacial and surfactant effect and be applied to facilitate emulsion process as well as reinforcing polymers.

Another object of the present invention is to provide a derivative of the clay/AMO complex and a method for producing the same, whereby nanosilica plates can be obtained through direct exfoliation and the intercalating agent AMO can be extracted, isolated and recycled for reusing.

Accordingly, the clay/AMO complex of the present invention includes an Amine terminating-Mannich Oligomer (AMO) and layered inorganic silicate clay, wherein the AMO is a straight-chain polymer formed by polymerizing polyoxyalkylene amine having a molecular weight over 1000, p-cresol and formaldehyde, and the layered inorganic silicate clay is intercalated with the AMO.

The complex may have a layered structure with interlayer distances ranging from 20 to 98 Å, or have an exfoliative nanostructure.

The aforementioned polyoxyalkylene amine can be polyoxypropylene diamine, polyoxyethylene diamine, or poly(oxyethylene-oxypropylene)diamine, wherein the polyoxypropylene diamine is preferred. The commercial polyoxyalkylene amine includes Jeffamine D2000 [poly(propylene glycol)bis(2-aminopropyl ether), Mw 2000], Jeffamine D4000 [poly(propylene glycol)bis(2-aminopropyl ether), Mw 4000], Jeffamine ED2001 [poly(propylene glycol)-block-poly(ethylene glycol)-block-poly(propylene glycol)bis(2-aminopropyl ether), Mw 2000], T3000 [tri-functional poly(propylene glycol)-2-aminopropyl ether, Mw 3000], T5000 [tri-functional poly(propylene glycol)2-aminopropyl ether, Mw 5000], etc., wherein the Jeffamine D2000 is preferred. The Jeffamine series product has formulae as follows:

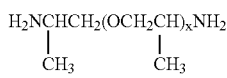

wherein x=33 (Approx. Mw=2000; Jeffamine® D-2000); or x=68 (Approx. Mw=4000; Jeffamine® D-4000);

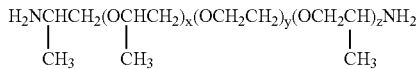

wherein x+z≈5, y≈39.5 (Approx. Mw=2000; Jeffamine® ED-2001).

The layered inorganic silicate clay used in the present invention is not restricted, for example, montmorillonite, kaolin, mica and talc. The layered inorganic silicate clay preferably has a cation exchange capacity (CEC) ranging from 50 meq/100 g to 200 meq/100 g.

The derivative obtained from the aforementioned clay/AMO complex is in the form of nanosilica plates and can be formed by extracting the complex with a hydroxide or a chloride of alkali metal or alkaline-earth metal, for example, sodium hydroxide, potassium hydroxide, sodium carbonate, sodium bicarbonate.

The method for producing the clay/AMO complex of the present invention primarily includes at least one step of intercalating the layered inorganic silicate clay with the AMO by powerfully stirring at 60–180° C. to perform cation exchange reaction; wherein the AMO serves as an intercalating agent. The AMO is preferably acidified with an inorganic acid such as hydrochloric acid to convert amine into quaternary ammonium salt before performing the cation exchange with clay, and the layered inorganic silicate clay is preferably swelled with water to allow the silicate layers fill with water as medium. The inorganic acid is provided to acidify the amino groups of the AMO to form a quaternary ammonium compound and perform cation exchange. Consequently, the pristine clay of hydrophilic nature is modified into hydrophobic and miscible with organic polymers. Furthermore, the interlayer distances of the clay are enlarged to 20–98 Å so as to allow polymers easily intercalate therebetween. The reaction scheme is as follows:

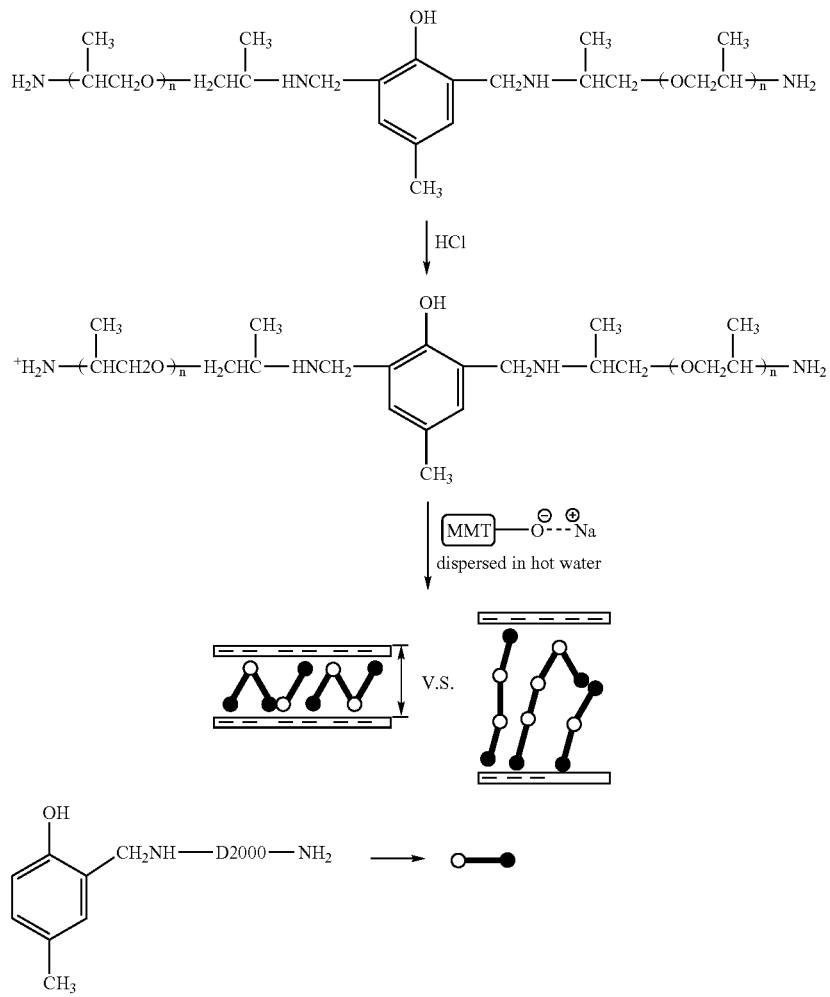

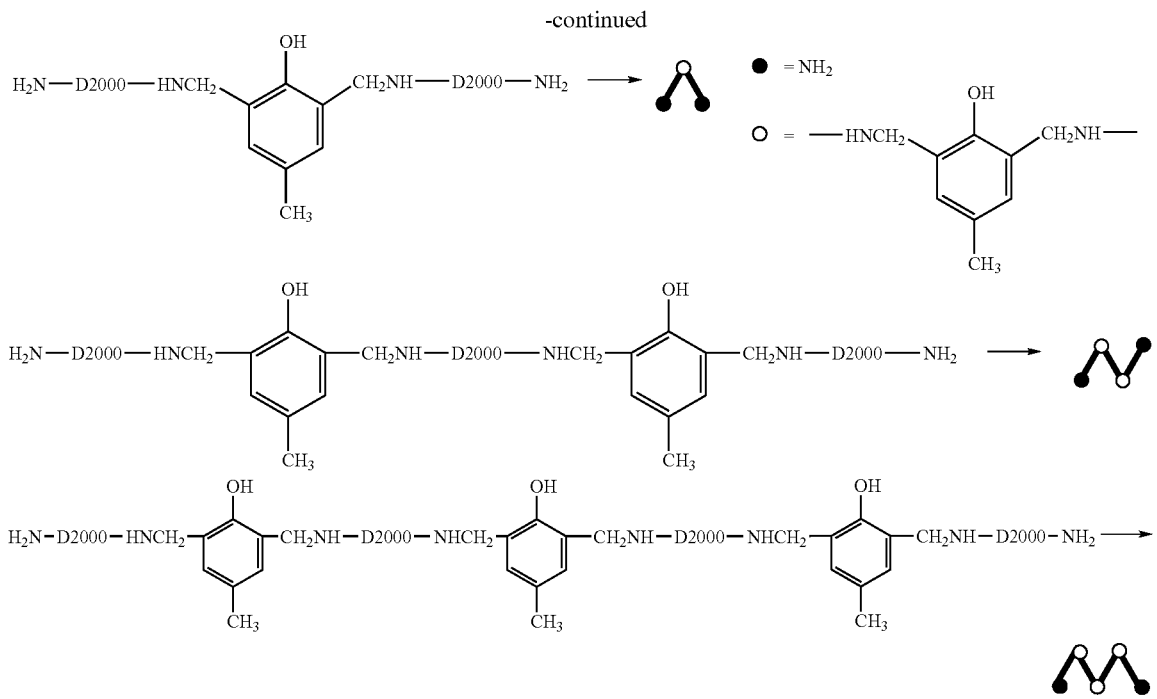

-continued

The aforementioned inorganic acid is not restricted, for example, hydrochloric acid, sulfuric acid, phosphoric acid and nitric acid.

The temperature for performing cation exchanging is usually controlled at 80–160° C., and preferably at 80–120° C.

In the method of the present invention, the ratio of the intercalating agent to the inorganic acid is controlled to generate specific quaternary ammonium compound in a zig-zag stretched form rather than a straight AMO. As a result, the direct exfoliation is obtained and, after the extractive separation, the nanosilica plates can be obtained.

The organic solvent aforementioned can be ether, ketone, ester, nitrile, saturated hydrocarbon, chloric saturated hydrocarbon or aromatic hydrocarbon, for example, tetrahydrofuran, isopropyl ether, methyl tert-butyl ether, methyl isobutyl ketone, acetonitrile, ethyl acetate, pentane, hexane, heptane, cyclohexane, dichloromethane, benzene, toluene, dimethylbenzene, chlorobenzene and methoxybenzene.

DESCRIPTION OF THE PREFERRED EMBODIMENTS

Figure 1:
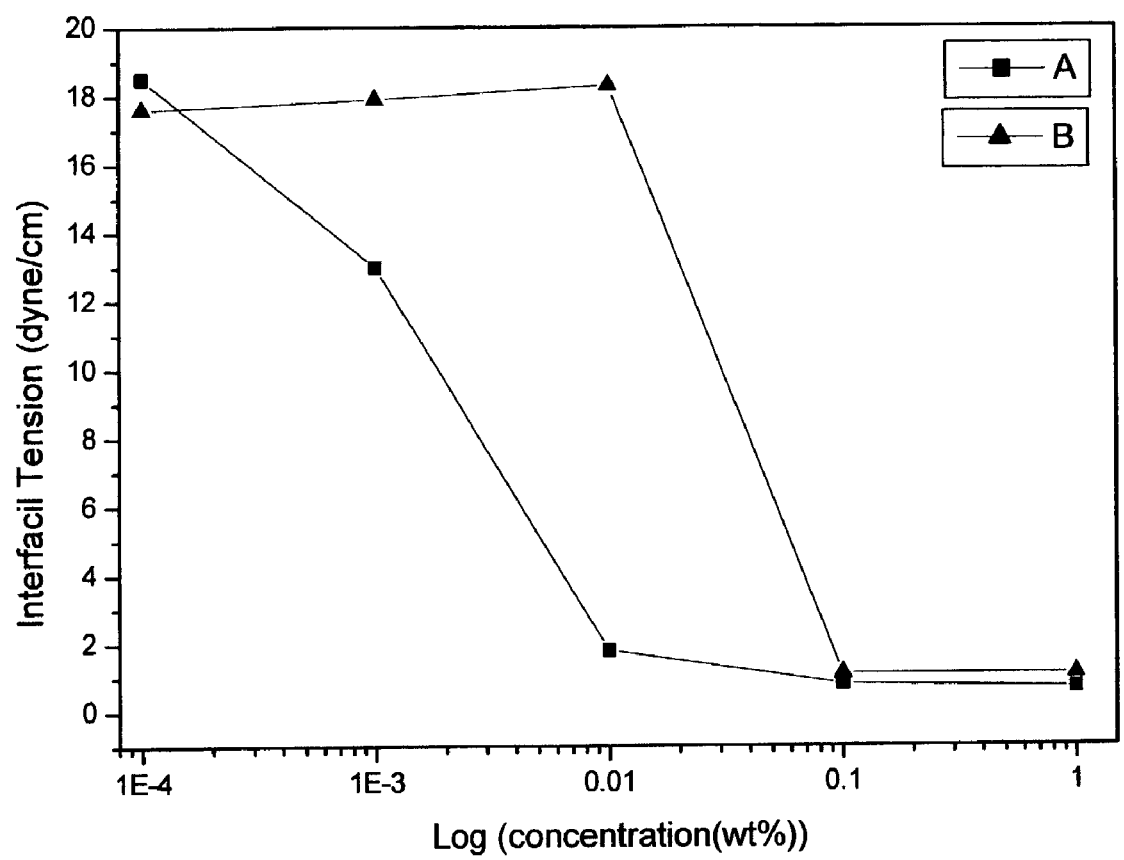
FIG. 1 shows the interfacial tensions of toluene/water when the MMT/AMO complex is added. The result indicates the surfactancy of the complex which exist in the interface of toluene/water in rendering the decrease of interfacial tension.

In order to explicitly explain the present invention, some preferred examples are described in detail as the follows. However, it should be noticed that the scope of the present invention is not limited to these examples.

In these examples, montmorillonite (MMT) is used, which is alumino-silicate clay, and has a structural formula including two layers of tetrahedral silicate and one layer of octahedral alumina therebetween. In general, the primary structure of the MMT includes average 10 parallel lamellae and is about 100 Å high with interlayer distances about 12 Å. The secondary structure of the MMT is about size 0.1–10μ in diameter and can be formed by aggregating hydrophilic silicate thereof.

The clay such as MMT may have cation exchange capacity (CEC) in a wide range, and preferably within 50–200 meq/100 g. Beyond such a range, the clay is difficult to be swelled because of insufficient ion exchange or excessive interlayer attraction. The MMT used in the following examples is Kunipia F ($Na^+$-MMT, CEC=115 meq/100 g). Other materials include p-cresol (ACROS Co., Mw 108, m.p. 31–34° C., b.p. 202° C.), poly (propylene glycol) bis (2-amino propyl ether) (Huntsman Chemical Co., trademark Jeffamine D2000, Mw 2000), and formaldehyde (ACROS Co., Mw 30, 37 wt % aqua solution).

EXAMPLES 1–5

The complexes of the present invention are produced according to steps of:

Step 1: Swelling the Layered Inorganic Silicate Clay (Sodium Form of Montmorillonite or $Na^+$-MMT)

$Na^+$-MMT (5 g) is dispersed in water (1,000 ml, 80° C.) by powerfully stirring for four hours, and then a stable and uniform slurry in earth color is formed.

Step 2: Synthesizing the Intercalating Agent AMO

P-cresol (5 g, 0.046 mol) and D2000 (185 g, 0.092 mol) are mixed by refluxing in toluene at 90° C. for 3 hours by using a Dean-Stark trap. Formaldehyde solution (37%, 10 g, 0.12 mol) is then added into the solution and heated to 130° C. for 5 hours. The reaction is stopped after removing the generated water before the formation of AMO gel. By measured with GPC, four peaks of Mw 2598, 5842, 9234 and 16952 oligomers can be observed. Four oligomers are analogs which can be used as such for intercalation. The titration values of primary amine, secondary amine and tertiary amine are 0.37 meq/g, 0.62 meq/g and 0 meq/g, respectively.

Step 3: Acidifying the Intercalating Agents

The intercalating agent AMO (13.5) is dissolved in water, and then equivalent moles of hydrochloric acid is added into therein at 80° C. to perform acidification for 30 minutes. The molar ratio of intercalating agent and HCl is varied in controlling the intercalation or exfoliation of MMT.

Step 4: Intercalating the AMO to the Layered Inorganic Silicate Clay

The acidified AMO is added into the slurry of Step 1 according to ratios of Table 1, and then powerfully stirred at 80° C. for 5 hours to perform cation exchange. The mixture is then settled and filtered. The product is dried in a vacuum oven for 24 hours to remove water. The tint solid, MMT/AMO complex, can be observed. The interlayer distances are detected with X-ray diffraction and listed in Table 1.

EXAMPLE 6

Repeat steps of Example 1, but HCl is added in a different ratio to the MMT as listed in Table 1. The interlayer distance of the product is measured by X-ray diffraction and listed in Table 1.

COMPARATIVE EXAMPLE 1

Repeat steps of Example 1, but no HCl is provided for acidification. The interlayer distance of the product is measured by X-ray diffraction and listed in Table 1.

TABLE 1

Intercalating MMT by using AMO/HCl at different ratio

| | AMO:MMT$^a$:HCl (mole ratio) | Interlayer distance (Å) | Intercalating agent/clay$^b$ (w/w %) | Intercalating agent/clay$^c$ (w/w %) |
|---|---|---|---|---|
| Example 1 | 1:3:3 | 39.4 | 48/52 | 45/55 |
| Example 2 | 1:2:2 | 50–52 | 61/39 | 57/43 |
| Example 3 | 2:3:3 | 50–52 | 66/34 | 66/34 |
| Example 4 | 1:1:1 | 50–52 | 73/27 | 72/28 |
| Example 5 | 2:1:1 | 61 | 83/17 | 83/17 |
| Example 6 | 2:1:0.5 | Exfoliate | 85/15 | 83/17 |
| Comparative Example 1 | 1:1:0 | 12 | — | — |

$^a$by CEC of MMT
$^b$by thermal gravimetric analysis (TGA)
$^c$by calculation

As listed in Table 1, the interlayer distances of Examples 1–5 are significantly larger than that of MMT without intercalation. In Examples 1–5, it's obvious that the interlayer distances increase when more AMO is added. Further, when the ratio of AMO to MMT is up to 2, exfoliation occurs in Example 6 by decreasing the acidifying agent HCl.

In Examples 1–6, emulsion occurs during reaction and the product settles as precipitates. However, no precipitate is observed during operation of Comparative Example 1, and the interlayer distance is the same as the MMT, 12 Å. That is, no intercalation can be carried out without pre-treating the intercalating agent with an acidifying agent.

FIG. 1 shows one of the applications for these intercalated complexes. The interfacial tensions of toluene/water significantly decrease with concentrations of the complexes MMT/AMO, both intercalated and exfoliate. Particularly, the interfacial tension of toluene/water drops from 18.5 dyne/cm when the intercalated complex MMT/AMO is added. The interfacial tension can be lowered even to 0.6 dyne/cm when the MMT/AMO complex is added at 100 ppm. That is, the MMT/AMO complex has a low critical micelle concentration (cmc) for surfactancy. Such phenomenon is beneficial to uniformly dispersing inorganic clay in polymers under a nanoscale regime.

What is claimed is:

1. A clay/AMO complex, comprising:
   an amine terminal-mannich oligomer (AMO) having a straight chain structure formed by polymerizing polyoxyalkylene amine with a molecular weight over 1000, p-cresol and formaldehyde; and
   layered inorganic silicate clay intercalated with said AMO.

2. The complex of claim 1, wherein said polyoxyalkylene amine is selected from the group consisting of polyoxypropylene diamine, polyoxyethylene diamine and poly(oxyethylene-oxypropylene)diamine adduct.

3. The complex of claim 1, wherein said polyoxyalkylene amine is polyoxypropylene diamine.

4. The complex of claim 1, wherein said layered inorganic silicate clay is selected from the group consisting of montmorillonite, kaolin, mica and talc.

5. The complex of claim 1, wherein said layered inorganic silicate clay has a cation exchange capacity ranging from 50 meq/100 g to 200 meq/100 g.

* * * * *